United States Patent [19]

Bhat et al.

[11] Patent Number: 4,670,024

[45] Date of Patent: Jun. 2, 1987

[54] SILICON NITRIDE CUTTING TOOL AND PROCESS FOR MAKING

[76] Inventors: Deepak G. Bhat, 1628 Lakewood, Troy, Mich. 48084; Paul F. Woerner, 60 Lewiston, Grosse Pointe Farms, Mich. 48236; Vinod Sarin, 7 Diamond Rd., Lexington, Mass. 02173

[21] Appl. No.: 779,360

[22] Filed: Sep. 23, 1985

[51] Int. Cl.[4] .............................................. B24D 11/00
[52] U.S. Cl. ......................................... 51/295; 51/293; 51/308; 51/309
[58] Field of Search .................... 51/293, 295, 308, 309

[56] References Cited

U.S. PATENT DOCUMENTS

| | | | |
|---|---|---|---|
| 4,388,085 | 6/1983 | Sarin et al. | 51/309 |
| 4,406,667 | 9/1983 | Sarin et al. | 51/309 |
| 4,406,668 | 9/1983 | Sarin et al. | 51/309 |
| 4,433,979 | 2/1984 | Sarin et al. | 51/309 |
| 4,441,894 | 4/1984 | Sarin et al. | 51/309 |
| 4,449,989 | 5/1984 | Sarin et al. | 51/309 |
| 4,461,799 | 7/1984 | Gavrilov et al. | 51/309 |
| 4,469,489 | 9/1984 | Sarin et al. | 51/309 |

*Primary Examiner*—Paul Lieberman
*Assistant Examiner*—Willie J. Thompson

[57] ABSTRACT

A coated cutting tool comprises a substrate having an outer coating of refractory material with an interfacial layer intermediate the substrate and outer coating for enhancing the adherence of the layer of refractory material to the substrate. The interfacial layer is provided by reacting titanium halide with a layer of alpha-silicon nitride to form a smooth and uniform layer of titanium nitride. The cutting tool may also comprise the intermediate products of alpha-coated silicon nitride or the titanium nitride coated tool formed by reacting the alpha-silicon nitride coating.

39 Claims, No Drawings

SILICON NITRIDE CUTTING TOOL AND PROCESS FOR MAKING

FIELD OF INVENTION

The present invention relates to processes for preparing silicon nitride cutting tools having adherent coatings.

PRIOR ART

Cemented carbide cutting tools are widely used in metal cutting application owing to their unique properties of high hardness, toughness, strength and wear resistance. It is known that the wear resistance of cemented carbide materials can be further improved by applying a thin layer of a coating of a refractory compound such as titanium carbide, titanium nitride, aluminum oxide and combinations thereof. Such coatings have widened the application range of cemented carbide tools.

Advances in metal working equipment manufacture, and economic necessities of higher productivity have combined to put greater demands of improved performance on the cutting tool materials. At higher cutting speeds, the chemical inertness of a cemented carbide tool as well as its strength are compromised due to higher temperatures generated from high speed machining. Even with coatings of refractory compounds such as aluminum oxide, the cemented carbide cutting tools have reached the useful limit due to thermal deformation of the tool tip, resulting in poor machining performance and tool life.

Conventional ceramic cutting tools such as aluminum oxide, aluminum oxide/titanium carbide composites and the like overcome many of these problems because of their superior thermal deformation resistance. They, however, suffer from low impact strength and fracture toughness.

Silicon nitride based cutting tool materials are found to have superior fracture toughness compared to alumina-based cutting tools, but show lower chemical wear resistance when cutting steel.

Patents to Sarin and Buljan et al all relate to the coating silicon nitride based cutting tools with coatings of carbides, nitrides and carbonitrides of titanium, vanadium, chromium, niobium, molybdenum, tantalum, tungsten, hafnium, and zirconium, as well as with aluminum and zirconium oxide. These patents are U.S. Pat. Nos. 4,406,669, 4,409,004, 4,409,003, 4,416,678, 4,421,525, 4,424,066, 4,426,209, 4,431,431, 4,440,547, 4,441,894, and 4,449,989. Typically the coating process is by vapor deposition.

U.S. Pat. Nos. 4,406,667, 4,406,668 and 4,406,670 to Sarin and Buljan et al, in particular, relate to the formation of a refractory metal nitride coated cutting tool. As set forth therein, titanium nitride layers are formed on the silicon nitride cutting tool by passing a gaseous mixture of titanium tetrachloride, a gaseous nitrogen source such as nitrogen or ammonia, and hydrogen over the substrate at appropriate temperatures.

SUMMARY OF THE INVENTION

When coating a silicon nitride substrate by the chemical vapor deposition technique at high temperatures, considerable stresses are developed due to thermal expansion mismatch between the coating and substrate making it difficult to consistently achieve strongly adherent coatings.

The process of the present invention initiates a surface layer on a silicon nitride substrate prior to coating with refractory materials such as the carbides, nitrides and carbonitrides of titanium, hafnium, and zirconium, as well as aluminum or zirconium oxide. The surface layer forms an inner or interfacial layer for enhancing the adherence of the outer refractory coating.

When initiating the above-mentioned surface layer, alpha-silicon nitride is formed on the silicon nitride substrate under conditions that promote a crystalline deposit. The alpha-silicon nitride coating is preferably in the form of a faceted crystal structure having a void free cross section. Hence, the present invention is also directed to a silicon nitride substrate having a coating of alpha-silicon nitride which may be used as an intermediate product or as a cutting tool.

When the substrate with the alpha-silicon nitride coating is used as an intermediate product, it can be reacted with a titanium halide to provide a smooth and uniformly adherent layer of titanium nitride. Hence, the present invention is also directed to a substrate having a uniform layer formed by chemically reacting titanium halide with alpha-silicon nitride.

The resulting substrate may be used as wear a resistance substrate, a cutting tool or an intermediate product to provide an interfacial layer for the coating of refractory material. The interfacial layer of chemically reacted alpha-silicon nitride is provided intermediate to the substrate and the layer of refractory material for enhancing the adherence of the layer of refractory metal material to the substrate.

DETAILED DESCRIPTION

The substrate body of the coated silicon nitride cutting tool of the present invention possesses a microstructure comprising a silicon nitride granular phase and an intergranular matrix phase. The intergranular matrix phase comprises silicon nitride and an effective amount of a densification aid selected from the group consisting of aluminum oxide, silicon dioxide, yttrium oxide, hafnium oxide, zirconium oxide, the lanthanide rare earth oxides, and mixtures thereof. The cutting tool substrates may contain additional phases in the form of intentional or unintentional additives. Such additional phases may include hard refractory particles. The particles may have a wide particle distribution resulting from the presence of milling medium or may represent a controlled additive in a predetermined amount with a predetermined particle distribution.

The intergranular matrix phase is essentially continuous and preferably substantially homogeneous. It is considered important to incorporate into the intergranular phase of the substrate body a densification aid which permits densification to densities approaching theoretical, and at the same time does not deleteriously affect the high temperature strength and creep resistance of the overall composite. Typical densification aids useful for this purpose are metal oxides selected from silicon dioxide, aluminum oxide, magnesium oxide, yttrium oxide, zirconium oxide, hafnium oxide, the lanthanide rare earth oxides, and mixtures thereof. Yttrium oxide is a preferred densification aid. Preferably the metal oxide densification aid is employed in an amount from about 3 to about 25 weight percent of the substrate body. More preferably the densification aid is present in an amount from about 4 to about 18 percent by weight.

Certain impurities and additives present in the overall composite substrate body tend to concentrate in the intergranular phase during the densifying process. Such further additional materials are preferably present in amounts less than about 5 weight percent of the matrix phase.

In addition to the matrix phase and silicon nitride phases hereinbefore discussed, the substrate may contain additional phases in the form of particles of hard refractory material which may be present, as previously mentioned, as an additive. By the term hard refractory material as used throughout this specification, it is meant any carbide and/or nitride and/or carbonitride of a refractory metal, including mixtures and solid solutions thereof. Particular refractory metals include titanium, vanadium, chromium, zirconium, niobium, molybdenum, hafnium, tantalum and tungsten which from the carbides, nitrides and solid solutions referred to. The additional phases of hard refractory material are preferably less than about 20 percent by weight.

In accordance with the principles of the present invention, the substrate is coated with alpha-silicon nitride. The preferred method of forming the alpha-silicon nitride coating is the conventional chemical vapor deposition but other techniques such as sputter deposition, plasma enhanced chemical vapor deposition, direct nitridation of silicon film, radio frequency glow discharge, vacuum evaporation, ion implantation, ion plating, and other techniques, as disclosed in the art, may be used.

According to the chemical vapor deposition technique, a silicon chloride gas reacts with ammonia according to the following reaction.

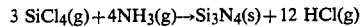

$$3\ SiCl_4(g) + 4NH_3(g) \rightarrow Si_3N_4(s) + 12\ HCl(g)$$

The gaseous reaction mixture may also include an inert gas. The process of the present invention can be typically carried out in apparatus suited for typical vapor deposition reactions. The reactant gases are passed over a substrate in a reaction zone. The temperature of the reaction zone, and of the substrate surface, as well as the total flow and composition of the gas phase over the substrate are so selected as to allow the reaction between the gas and the substrate surface to proceed according to the thermodynamic principles. The total flow conditions and the total gas pressure are so selected as to allow the products of the reaction to be removed continuously from the reaction zone. The resulting coating is preferably uniform and homogeneous. The interfacial coating is preferably at least about one micron in thickness and more preferably from about 2 to about 5 microns in thickness.

Preferably the reaction is carried out at conditions which promote the deposition of a dense, void-free coating having a faceted crystal structure as opposed to a lower density porous structure having voids when examined in cross section as might be formed when the alpha-silicon nitride is in the form of needle-like crystals.

The substrate surface coated with alpha-silicon nitride is reacted with a refractory metal halide to form an interfacial layer comprising a refractory metal chemically reacted to form a refractory metal nitride. The reactive gas is preferably titanium tetrachloride although it is contemplated that other refractory metal halide gases may be suitable. It is believed that the titanium tetrachloride reacts with the silicon nitride surface according to the following reaction.

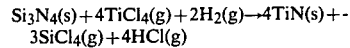

$$Si_3N_4(s) + 4TiCl_4(g) + 2H_2(g) \rightarrow 4TiN(s) + 3SiCl_4(g) + 4HCl(g)$$

The gaseous reaction mixture may also include an inert gas. The reaction gas is characterized by the absence of a carbon or nitrogen source which would preferentially react with the titanium chloride. Preferably the temperatures employed are from about 900 degrees centigrade to about 1600 degrees centigrade and preferably from about 1000 to about 1300 degrees centigrade.

The reaction is preferably carried out under suitable conditions so that substantially all the titanium nitride present at the surface after reaction is formed by the reaction of alpha-silicon nitride present in the previously deposited layer with the titanium chloride gas. The process of the present invention can be typically carried out in apparatus suited for typical vapor deposition reactions. The reactant gases are passed over a substrate in a reaction zone. The temperature of the reaction zone, and of the substrate surface, as well as the total flow and composition of the gas phase over the substrate are so selected as to allow the reaction between the gas and the substrate surface to proceed according to the thermodynamic principles. The total flow conditions and the total gas pressure are so selected as to allow the products of the reaction to be removed continuously from the reaction zone. The resulting coating is preferably uniform and homogeneous. The interfacial coating is preferably at least about one micron in thickness and more preferably from about 2 to about 5 microns in thickness. The interfacial coating may include unreacted alpha-silicon nitride.

The substrate having the interfacial layer, may be conveniently coated with a refractory metal composition according to techniques known in the prior art. The layer of refractory material is selected from the group consisting of metal oxides such as aluminum oxide, refractory metal carbides, refractory metal nitrides, refractory metal carbonitrides, and/or combinations of the above.

EXAMPLE

SUBSTRATE PREPARATION

The following techniques are illustrated of a method of preparing the substrates. Substrates may be conveniently prepared by cold pressing followed by sintering, hot isostatic pressing, over pressure sintering and other techniques known in the art.

The substrates may be conveniently prepared according to the following technique. A powder mixture of silicon nitride, metal oxide densification aid and any additional hard refractory materials are mixed according to the proper proportions depending on the desired final composition. To one part by weight of the above mixture is added about 2.5 parts by weight toluene, 0.1 parts by weight of methanol, and about 0.05 parts by weight of steric acid. The resulting slurry is thoroughly mixed by ball milling and then dried at 75 degrees centigrade. The resulting dry mixture is ball milled for about 24 hours and then mixed with about 0.05 parts by weight of a copolymer of polyethylene glycol and methoxypolyethylene glycol, 1 part by weight toluene, and about 0.05 parts by weight methanol. This mixture is mixed by ball milling for about 15 minutes, dried at 75 degrees centigrade and then screened through a 60 mesh screen. The −60 mesh fraction is pressed at ambient temperatures at a pressure of about 25,000 psig to obtain a green compact. The residual solvents and stearic acid binder are removed from the green compact by heating at about 600 degrees centigrade in an inert atmosphere. According to one method, the green compact is then sintered to a hard, highly densified composite body by heating at a temperature of between about 1700 and about 1850 degrees centigrade. According to another method, the −60 mesh portion prior to obtaining a green compact is pressed at a pressure of about 3000 psig and a temperature of about 1700 degrees centigrade to produce a hard, highly densified composite body. This latter method which requires the simultaneous application of high temperatures and heat is hereinafter referred to as hot pressing. The resulting hot pressed bodies may have a high proportion of silicon nitride present as beta-silicon nitride.

PREPARATION OF ALPHA-SILICON NITRIDE LAYER

The substrates prepared, according to the above discussed techniques, are coated with alpha-silicon nitride according to the following procedure.

Substrates of hot pressed silicon nitride composition are placed in a heated furnace. A mixture of gases consisting of silicon tetrachloride, ammonia, hydrogen and argon are introduced at one atmosphere pressure in the furnace, and the reaction is allowed to occur for about 1 hour. It is understood that the reaction between said gases can also occur at subatmospheric pressures. Depending upon the gas flow rates and temperature different coating thicknesses are obtained. Typical values for flow rates, temperatures and coating thicknesses for a one-atmosphere process are shown in Table I for the runs which result in an alpha-silicon nitride coating.

In general, the tendency of the deposit to become crystalline is strongly dependent on temperature, and relatively less so on the Si/N ratio. The tendency to form whisker-like deposit, or a deposit with crystallites having an aspect ratio of greater than about 3, is also predominant at higher temperatures and higher Si/N ratios. Typical for a crystalline deposit is a faceted morphology, with well-developed crystallographic planes.

The reaction between $SiCl_4$ and $NH_3$ occurs in a series of intermediate steps, each of which is extremely sensitive to local variations in the temperature and gas composition.

The detailed observations of the orientation of crystalline deposits show that the most dominant orientation of silicon nitride is (2020), followed usually by (2130). The orientation is significant from the standpoint of the surface hardness of the deposit. Thus, maintaining a (2020) or (2130) orientation of the deposit would be advantageous in terms of surface hardness. Typical hardness values for polycrystalline alpha-$Si_3N_4$ with (1120) and (2130) orientations are found to be about 3800 kg/mm$^2$ (HV$_{100}$). Therefore, it becomes necessary to control the parameters of deposition precisely so as to obtain consistent coating properties on a repetitive basis.

PREPARATION OF INTERLAYER

Next, the alpha-silicon nitride coated substrates of hot-pressed silicon nitride are placed in a graphite resistance heated furnace at about 1250° C. A mixture of gases consisting of titanium chloride, hydrogen, and argon is introduced into the furnace, and the reaction is allowed to occur for about thirty minutes. The samples show the presence of a gold-colored deposit, about 3 microns in thickness. X-ray diffraction analysis of the coating shows that it is titanium nitride.

PREPARATION OF REFRACTORY MATERIAL COATING

The substrate bodies having an interfacial layer is coated with aluminum oxide by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated substrate together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is often added to insure that the reaction takes place in reducing atmosphere.

$$2AlCl_3 + 3H_2O \rightarrow Al_2O_3 + 6HCl$$

The substrate piece or pieces are heated to a temperature between about 800 degrees C. to about 1500 degrees C. and the gaseous mixture is passed over the heated substrate until the desired coating thickness is achieved.

As an example, titanium carbide layers are formed on the silicon nitride substrate having the interfacial layer by passing titanium tetrachloride, a gaseous carbon source such as methane, and hydrogen over the substrate at a temperature of between about 800 degrees C. and 1500 degrees C. The reaction is described by the following equation, although hydrogen is often added to insure that the reaction takes place in a reducing environment.

$$TiCl_4 + CH_4 \rightarrow TiC + 4HCl$$

Similarly, titanium nitride layers may be formed according to the following reaction.

$$2TiCl_4 + N_2 + 4H_2 \rightarrow 2TiN + 8HCl$$

Similarly, a layer of titanium carbonitride may be formed by a combination of the above reactions wherein both a carbon and nitrogen source are present in the reaction gases in a desired proportion. It is also contemplated that titanium in the above reactions may be substituted with a suitable refractory metal halide. Typical refractory metals include titanium, vanadium, chromium, zirconium, niobium, molybdenum, hafnium, tantalum and tungsten. Titanium and hafnium are preferred.

TABLE I

Typical CVD Parameters for CVD Alpha Silicon-nitride Coating on Cutting Tools

| Experiment # | Temp. °C. | $SiCl_4$ | $NH_3$ Flow in SCCM | $H_2$ | Ar | Si/N Ratio | Coating Thickness Microns | Crystal Structure of Coating |
|---|---|---|---|---|---|---|---|---|
| 1 |  | 300 | 100 | 4000 | 3100 | 3.00 | 35–40 | $\alpha$-$Si_3N_4$ |
| 2 | 1225 | 25 | 100 | 1250 | 6125 | 0.25 | 4–6 | $\alpha$-$Si_3N_4$ |
| 3 |  | 50 | 100 | 1500 | 5850 | 0.50 | 15–20 | $\alpha$-$Si_3N_4$ |
| 4 |  | 100 | 100 | 2000 | 5300 | 1.00 | 10–15 | $\alpha$-$Si_3N_4$ |
| 5 |  | 200 | 100 | 3000 | 4200 | 2.00 | 7–8 | $\alpha$-$Si_3N_4$ |
| 6 |  | 400 | 100 | 5000 | 2000 | 4.00 | 18–22 | $\alpha$-$Si_3N_4$ |
| 7 |  | 50 | 100 | 1500 | 5850 | 0.50 | 25–35 | $\alpha$-$Si_3N_4$ |
| 8 |  | 200 | 100 | 3000 | 4200 | 2.00 | 1–5 | $\alpha$ |
| 9 |  | 400 | 100 | 5000 | 2000 | 4.00 | 10–35 | $\alpha$ |
| 10 | 1425 | 25 | 100 | 1250 | 6125 | 0.25 | 2–3 | $\alpha$ |
| 11 |  | 200 | 100 | 3000 | 4200 | 2.00 | 5–10 | $\alpha$ |

What is claimed is:

1. A coated cutting tool comprising a substrate, a layer of refractory material, and a coated interfacial layer intermediate said substrate and said layer of refractory material, said coated interfacial layer comprising a smooth and uniform layer of titanium nitride being formed by chemically reacting titanium halide with alpha-silicon nitride for enhancing the adherence of said layer of refractory metal material to said substrate.

2. A coated cutting tool according to claim 1 wherein said substrate comprises a ceramic silicon nitride, said uniform layer of titanium nitride is adjacent said layer of refractory metal material.

3. A coated cutting tool according to claim 2 wherein said layer of refractory material is selected from the group consisting of refractory metal oxides.

4. A coated cutting tool according to claim 2 wherein said layer of refractory material is selected from the group consisting of refractory metal carbides, refractory metal nitrides or refractory metal carbonitrides.

5. A coated cutting tool according to claim 2 wherein said interfacial layer includes a portion of unreacted alpha-silicon nitride immediately adjacent said ceramic silicon nitride.

6. A coated cutting tool according to claim 2 wherein said substrate comprises a silicon nitride phase and a matrix phase including a densification aid selected from the group consisting of silicon dioxide, aluminum oxide, magnesium oxide, yttrium oxide, hafnium oxide, zirconium oxide, the lanthanide rare earth oxides, and mixtures thereof.

7. A coated cutting tool according to claim 6 wherein at least a portion of said silicon nitride is beta-silicon nitride.

8. A coated cutting tool according to claim 7 wherein said substrate is prepared by hot pressing, hot isostatic pressing, cold pressing followed by sintering, or over pressure sintering.

9. A coated cutting tool according to claim 8 wherein said layer of refractory material is selected from the group consisting of refractory metal oxides.

10. A coated cutting tool according to claim 8 wherein said layer of refractory material is selected from the group consisting of refractory metal carbides, refractory metal nitrides or refractory metal carbonitrides.

11. A coated cutting tool according to claim 10 wherein said interfacial layer includes a portion of unreacted alpha-silicon nitride immediately adjacent said ceramic silicon nitride.

12. A coated cutting tool according to claim 7 wherein said substrate comprises an addition phase comprising particles of a hard refractory material.

13. A coated cutting tool according to claim 12 wherein said layer of refractory material is selected from the group consisting of refractory metal oxides.

14. A coated cutting tool according to claim 13 wherein said layer of refractory material is selected from the group consisting of refractory metal carbides, refractory metal nitrides or refractory metal carbonitrides.

15. A coated cutting tool according to claim 14 wherein said interfacial layer includes a portion of unreacted alpha-silicon nitride immediately adjacent said ceramic silicon nitride.

16. A process for producing a cutting tool having a silicon nitride substrate coated with a refractory material comprising reacting titanium halide with a surface portion of a substrate to form a uniform layer comprising for enhancing the adherence of said refractory metal material to said substrate, said surface portion comprising a coated layer of alpha-silicon nitride.

17. A process for producing a coated cutting tool according to claim 16 wherein said substrate comprises a ceramic silicon nitride and said titanium halide incompletely reacts with said alpha-silicon nitride whereby a portion of unreacted alpha-silicon nitride is immediately adjacent said ceramic silicon nitride.

18. A process for producing a coated cutting tool according to claim 17 wherein said layer of refractory material is selected from the group consisting of refractory metal oxides.

19. A process for producing a coated cutting tool according to claim 18 wherein said layer of refractory metal carbides, refractory metal nitrides or refractory metal carbonitrides.

20. A process for producing a coated cutting tool according to claim 19 wherein said substrate comprises a silicon nitride phase and a matrix phase including a densification aid selected from the group consisting of silicon dioxide, aluminum oxide, magnesium oxide, yttrium oxide, hafnium oxide, zirconium oxide, the lanthanide rare earth oxides, and mixtures thereof.

21. A process for producing a coated cutting tool according to claim 16 wherein said silicon nitride substrate comprise beta-silicon nitride.

22. A process for producing a coated cutting tool according to claim 21 wherein said substrate is prepared by hot pressing, hot isostatic pressing, cold pressing followed by sintering, or overpressure sintering.

23. A process for producing a coated cutting tool according to claim 22 wherein said layer of refractory material is selected from the group consisting of refractory metal oxides, refractory metal carbides, refractory metal nitrides or refractory metal carbonitrides.

24. A process for producing a coated cutting tool according to claim 22 wherein said layer of refractory material is selected from the group consisting of refractory metal carbides, refractory metal nitrides or refractory metal carbonitrides.

25. A process for producing a coated cutting tool according to claim 17 wherein said substrate comprises an addition phase comprising particles of a hard refractory material.

26. A process for producing a coated ceramic silicon nitride cutting tool according to claim 25 wherein said layer of refractory material is selected from the group consisting of refractory metal carbides, refractory metal nitrides or refractory metal carbonitrides.

27. A process for producing a coated ceramic silicon nitride cutting tool according to claim 26 wherein said layer of refractory material is selected from the group consisting of refractory metal carbides, refractory metal nitrides or refractory metal carbonitrides.

28. A coated cutting tool comprising a ceramic silicon nitride substrate and a coated layer comprising a smooth and uniform layer of titanium nitride being formed by chemically reacting titanium halide with coated alpha-silicon nitride layer.

29. A coated cutting tool according to claim 28 wherein said layer includes a portion of unreacted alpha-silicon nitride immediately adjacent said ceramic silicon nitride.

30. A coated cutting tool according to claim 28 wherein said substrate comprises a silicon nitride phase and a matrix phase including a densification aid selected from the group consisting of silicon dioxide, aluminum oxide, magnesium oxide, yttrium oxide, hafnium oxide, zirconium oxide, the lanthanide rare earth oxides, and mixtures thereof.

31. A coated cutting tool according to claim 30 wherein at least a portion of said silicon nitride is beta-silicon nitride.

32. A coated cutting tool according to claim 31 wherein said substrate is prepared by hot pressing, hot isostatic pressing, cold pressing followed by sintering, or over pressure sintering.

33. A coated cutting tool according to claim 32 wherein said interfacial layer includes a portion of unreacted alpha-silicon nitride immediately adjacent said ceramic silicon nitride.

34. A coated cutting tool according to claim 33 wherein said substrate comprises an addition phase comprising particles of a hard refractory material.

35. A process for producing a silicon nitride cutting tool coated with titanium nitride comprising reacting titanium halide with a surface portion of a substrate to form a uniform layer for enhancing the adherence of said refractory metal material to said substrate, said surface portion comprising a layer of alpha-silicon nitride.

36. A process for producing a coated cutting tool according to claim 35 wherein said substrate comprises a ceramic silicon nitride and said titanium halide incompletely reacts with said alpha-silicon nitride whereby a portion of unreacted alpha-silicon nitride is immediately adjacent said ceramic silicon nitride.

37. A process for producing a coated cutting tool according to claim 36 wherein said substrate comprises a silicon nitride phase and a matrix phase including a densification aid selected from the group consisting of silicon dioxide, aluminum oxide, magnesium oxide, yttrium oxide, hafnium oxide, zirconium oxide, the lanthanide rare earth oxides, and mixtures thereof.

38. A process for producing a coated cutting tool according to claim 37 wherein at least a portion of said silicon nitride is beta-silicon nitride.

39. A process for producing a coated cutting tool according to claim 38 wherein said substrate is prepared by hot pressing, hot isostatic pressing, cold pressing followed by sintering, or overpressure sintering.

* * * * *